United States Patent [19]

Leukhardt et al.

[11] 4,249,117
[45] Feb. 3, 1981

[54] ANTI-KICKBACK POWER TOOL CONTROL

[75] Inventors: Jill L. Leukhardt, Baltimore; David A. Saar, Timonium, both of Md.

[73] Assignee: Black and Decker, Inc., Newark, Del.

[21] Appl. No.: 35,130

[22] Filed: May 1, 1979

[51] Int. Cl.³ ............................................. H02P 3/00
[52] U.S. Cl. ................................... 318/275; 318/566;
318/367; 318/434; 318/458; 318/476; 173/12
[58] Field of Search ............... 318/566, 275, 332, 367,
318/430, 431, 432, 434, 456, 458, 474, 476;
361/111, 33; 173/5, 7, 12

[56] References Cited

U.S. PATENT DOCUMENTS

| 1,184,826 | 5/1916 | Cooper | 318/111 |
| 2,617,971 | 11/1952 | Stack | 318/476 |
| 3,926,264 | 12/1975 | Bardwell et al. | 318/434 |
| 4,090,116 | 11/1978 | Lippitt | 318/345 E |

FOREIGN PATENT DOCUMENTS 2742216  3/1979  Fed. Rep. of Germany ........... 318/434

Primary Examiner—J. V. Truhe
Assistant Examiner—Eugene S. Indyk
Attorney, Agent, or Firm—Leonard Bloom; Edward D. Murphy; Harold Weinstein

[57] ABSTRACT

An impending kickback condition in the operation of a power tool or machine tool system is sensed and used to control or eliminate the kickback. The ability to sense an impending kickback condition can be used in all categories of power driven tools. The change in force applied to the power driven tool or other implement is monitored with a microcomputer by measuring the rate of change of current. If the current is increasing, the microcomputer compares the rate of change of current with a threshold value which may be either preset or computed by the microcomputer. If this threshold value is exceeded, an output control signal is generated by the microcomputer which inhibits the coupling of power to the tool or other implement and/or applies a brake to stop the tool or implement. In order for power to once again be coupled to the tool or implement, the start switch must be opened and then reclosed or some other signal provided by the operator or another predetermined condition must be fulfilled.

34 Claims, 8 Drawing Figures

FIG. 1
FIG. 3
FIG. 2
FIG. 4
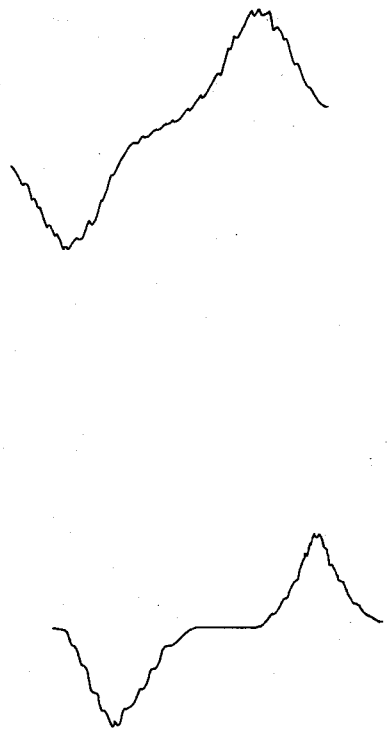
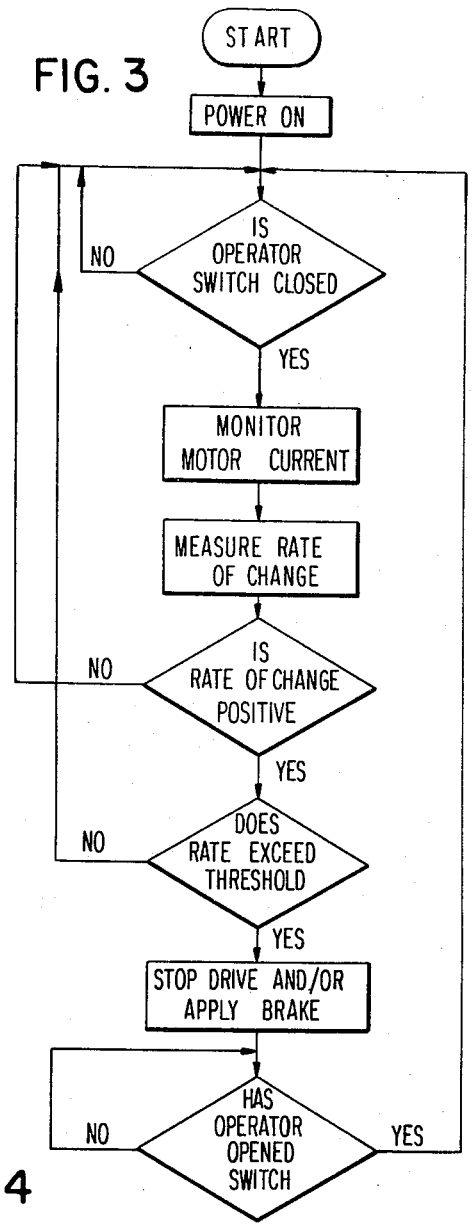
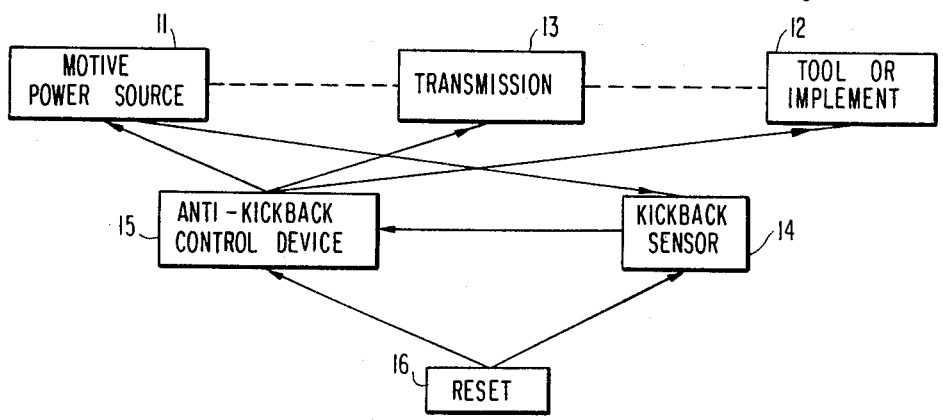

ANTI-KICKBACK POWER TOOL CONTROL

BACKGROUND OF THE INVENTION

The present invention generally relates to safety devices for power driven tools and machine tool systems, and more particularly, to an anti-kickback power tool control method and system which is capable of sensing a significant and rapid change in the load on the tool and turning off the power to the tool and/or applying a brake before lock-up occurs between the tool or implement and the workpiece. As used herein, the term "implement" means the tool or implement which is driven by the electric motor of the power tool. Thus, the term "implement" includes such devices as saw blades, drill and router bits, abrasive wheels, and the like. The terms "power tool", "machine tool" and similar terms refer to the total combination including the electric motor and the driven implement.

Kickback is defined as that condition when the power driven tool or other implement abnormally and rapidly engages the workpiece in such a manner as to transfer at a high rate the power of the motive power source and/or the inertial energy of the power tool to the power tool or the workpiece or both resulting in an undesired and generally uncontrolled motion of the power tool or the workpiece or both. Kickback can be caused by a variety of factors including but not limited to sudden or excess force by the operator, nonuniform hardness or a defect in the workpiece, and where the workpiece is wood or other cellular material, the accumulation of moisture. In the case of a saw, the kerf may close and pinch the blade to cause a kickback, and in the case of a drill, kickback may occur when the bit breaks through the workpiece.

Consider, for example, a portable circular saw of the type used on construction sites. Typically, plywood sheathing is first nailed to a framing structure, such as roofing trusses, and then the projecting ends of the plywood are sawed off evenly. If in this process a kickback were to occur due to the kerf closing as the ends of the wood sag under their own weight, the portable circular saw could kick out of the workpiece and fly back toward the operator, possibly resulting in serious bodily injury. On the other hand, in the case of a bench saw or a radial arm saw where the workpiece is fed into the saw blade, a kickback would result in the workpiece being driven back toward the operator at a high rate of speed, again with the possibility of serious bodily injury. It will be understood by those familiar with the art that kickback is not a condition which is limited to circular saws but may be experienced with any power driven tool or machine tool system. For example, kickback may occur with portable, bench or stationary power drills, routers and shapers, portable and bench planers, abrasive wheel grinders, milling machines, reciprocating saws and the like. All of these tools are typically driven with electric motors, including universal, D.C., single phase or polyphase motors, but kickback is not a condition dependent on the motive power source but rather on the abnormal engagement of the implement with the workpiece as defined above.

There have been many attempts to eliminate or reduce the hazards of kickbacks in power tools. For example, in bench saws and in radial arm saws, a plurality of freely rotating pawls carried on an adjustable support with the support clamped to the saw bench or frame have been provided. In use, the pawls are adjusted downwardly toward the workpiece so that the workpiece as it is fed to the cutting edge of the saw blade pushes the pawls upwardly and freely passes under the pawls. In the event of the kickback, the pawls are designed to dig into the surface of the workpiece to prevent the workpiece from being kicked back toward the operator. This anti-kickback device is generally effective, but may damage the workpiece.

SUMMARY OF THE INVENTION

It is therefore an object of this invention to provide an improvement in anti-kickback power tool control methods and systems which may be used in all types of power cutting tools, including stationary, bench and portable tools.

It is another object of the present invention to provide an anti-kickback power tool control which may be incorporated into the power tool and requires no adjustment or operation by the operator and which cannot be defeated by the operator.

It is a further object of the present invention to provide the ability to sense an impending kickback condition in the operation of a power tool or machine tool system.

These and other objects of the invention are achieved in a novel anti-kickback control method and system. An operator or start switch is typically closed to enable an electric motor to supply power to a shaft connected to drive a tool or other implement. This operator or start switch may take the form of a trigger switch in a portable tool, a rocker switch in a bench tool or a remotely operated switch in a stationary tool. The anti-kickback control monitors the change of force or torque applied to the implement by measuring the rate of change of motor current. This rate of change is compared with a threshold value, and if the threshold value is exceeded, an output control signal is generated which turns off the power to the tool and/or applies a brake. The threshold may be preset, predetermined or dynamically variable. Alternatively, when the threshold is exceeded the direction of motion of the shaft may be reversed or the direction torque may be reversed. In order to again apply power to the shaft, the operator or start switch must be opened and then closed again or some other signal provided by the operator or another predetermined condition must be fulfilled.

The invention is based on the discovery that in the early stages of tool kickback, there is a significant and rapid change in the load on the tool. This can be measured as an increase in force or torque which can be reflected in an increase in motor current in an electric motor driven tool. Kickback is not instantaneous. For example, in wood as a workpiece kickback may take anywhere from 10 to 200 milliseconds (ms.) before lock-up occurs between the implement and the workpiece. The present invention detects the impending lock-up as a rapid increase in motor current and turns off the power to the tool and/or applies a brake before lock-up occurs. In prototypes which have been tested, the worst case detection time plus action time has been 16.6 milliseconds which has been sufficiently fast to be effective for the power tool and workpiece tested. With the present state of the art, this time could be easily reduced by at least an order of magnitude so that detection time plus action time can be short enough to prevent kickback in almost any environment.

In the normal operation of the power tool, there are current variations associated with speed variations when the tool implement engages and disengages the workpiece. More particularly, the maximum normal deceleration of the power tool is a function of the work load and motor power and, to a lesser extent, the tool inertia. On the other hand, the maximum normal acceleration of the power tool is primarily a function of the motor power and the tool inertia. The power tool/workpiece system can be analyzed in terms of the energy in the system using the following variables:

$U_1$ = energy generated from inertia (in.−lb.)
$U_1 = \frac{1}{2} I \chi_o^2$, where I is the moment of inertia of the system and $\omega_o$ is velocity
$U_2$ = energy generated from electro-magnetic field (in.−lb.)
$U_2 = \int P dt = \bar{P} t_s$, where $\bar{P}$ is average power output and $t_s$ is duration of lock-up
$U_3$ = energy absorbed by system before kickback (in.−lb.)
$U_3 = \frac{1}{2} I(\Delta\omega)^2 + (\bar{P}_a)(t_a)$, where $\Delta\omega$ is change in velocity during energy absorbing period, $\bar{P}_a$ is average watts output during energy absorbing period, and $t_a$ is duration of energy absorbing period
$U_4$ = energy in kickback (in.−lb.) More specifically, the system energy equation is as follows:

$$U_1 + U_2 = U_3 + U_4 \quad (1)$$

Equation (1) may be rewritten in terms of the energy in kickback $U_4$ as follows:

$$U_4 = U_1 + U_2 - U_3 \quad (2)$$

As will become clear from the following detailed description of the preferred embodiments of the invention, the addition of the anti-kickback control according to the invention results in a modification of equation (2) as follows:

$$U_4 = U_1 - U_3 \quad (3)$$

This is due to the fact that $U_2 \rightarrow 0$ when the electric power input is cut off at the beginning of lock-up. From emperical observation, it has been determined that typically $U_1 \simeq U_3$, and therefore $U_4 \rightarrow 0$.

When the tool or other implement engages the workpiece, inertial energy plus drive energy is transferred to the workpiece causing a reduction in tool speed. The absolute value of the slope of the current due to this reduction in speed normally will not exceed a value determined by the motor power plus a small contribution of inertia. Thus, the antikickback power tool control according to the present invention does not react to relatively small or slow changes of current which occur in normal operations. The kickback problem occurs when the transfer of inertial energy becomes large in a very short period of time, on the order of 10 to 100 ms. This results in a very rapid increase in current which is detected by the anti-kickback power tool control to turn off the power to the tool and/or apply a brake.

Measurement of change in current as a method for detecting and preventing tool kickback has several difficulties associated with it. The first concerns when to take the current samples. The problem is illustrated by reference to FIG. 1 which shows the typical current waveform of a portable electric drill powered by a universal motor. As is quite apparent from the figure, the current waveform is substantially distored from a pure sinusoidal waveform. The problem is further compounded when electronic speed control circuits using, for example, SCRs or triacs are used with the tool. FIG. 2 illustrates the current waveform of a portable electric drill powered by a universal motor and provided with an electronic speed control. FIGS. 1 and 2 indicate that sampling at a fixed time delayed from the A.C. line crossing would result in erroneous information as to the current value. This in turn could lead to false tripping of the kickback turn-off or to failure to detect an impending kickback. The present invention overcomes this problem by computing the current sampling time at some determinate point in the current waveform. This may be, for example, a function of firing time of the SCRs or triac in an electronic switch controlled electric motor driven power tool.

The second difficulty in sampling current in order to compute change in current is the necessity to "ignore" the small deviations which are superimposed on the current waveform. This "noise" is apparent in FIGS. 1 and 2. The invention accomplishes this by taking a plurality of samples and filtering the sampled data. As used herein, the term "filtering" means a procedure or device that separates data or signals in accordance with a specified criteria. In one prototype or the invention which has been constructed, four samples are taken approximately 40 microseconds apart. The values of these samples are then averaged, and the resulting average value is used as the current value. However, other mathematical manipulations of the sampled values can be employed to improve their accuracy. For example, the highest and lowest values may be disregarded and the remaining samples averaged and/or weighted averaging or least squares techniques may be employed. Any such mathematical manipulations may be considered a form of arithmetical filtering.

Because of the current sampling problems discussed above, implementation of the invention is best accomplished using digital techniques, and a digital implementation has been constructed using a commercially available microcomputer. In this particular implementation, current is continuously monitored with an operational amplifier which measures the voltage drop across a low value resistance in series with the motor. The output of the operational amplifier is periodically converted to a digital value by an analog-to-digital converter. A microcomputer is provided with zero crossing information of the A.C. line source and is programmed to first compute the firing time of the electronic switching circuit and then compute the time until current sampling. When it is time for current sampling, the microcomputer provides a command to the analog-to-digital converter to read out a plurality of successive samples. The values of these samples are averaged or otherwise adjusted for variation in the sample values due to noise or other disturbances. The source of the noise or other disturbance may be both internal from commutator and armature slots, and from external line noise as well as other sources. The change in current is computed by subtracting the previously measured current from the just computed current. The difference between these two current averages is an approximation of the first derivative of the current and hence the rate of change of the current. If the difference is positive, the current is increasing. Under this condition, it is necessary to determine if the difference exceeds a threshold value, and if it does, an impending kickback condition has been detected. In the particular implemention which has been built, detection of an impending kickback condition results in the microcomputer generating no further firing commands to the electronic switching circuit thereby effectively turning off the tool. In some applications, particularly those involving bench and stationary tools, it may be desirable for the microcomputer to additionally generate a command to apply a brake. Such a brake might be, for example, a solenoid operated friction brake but more advantageously where large loads are involved, may be an electromagnetic brake controlled by the microcomputer.

BRIEF DESCRIPTION OF THE DRAWINGS

The invention will be better understood from the following detailed description of the invention which makes reference to the accompanying drawings, in which:

FIG. 1 is a typical waveform diagram of the current flowing through the universal motor of a conventional portable power drill;

FIG. 2 is a current waveform diagram for a universal motor driven drill provided with electronic speed control;

FIG. 3 is a flow diagram illustrating the general operation of the subject invention;

FIG. 4 is a system block diagram illustrating the various alternative combinations of sensing and control which may be used in the practice of the invention;

DESCRIPTION OF THE PREFERRED EMBODIMENT

Figure 5:
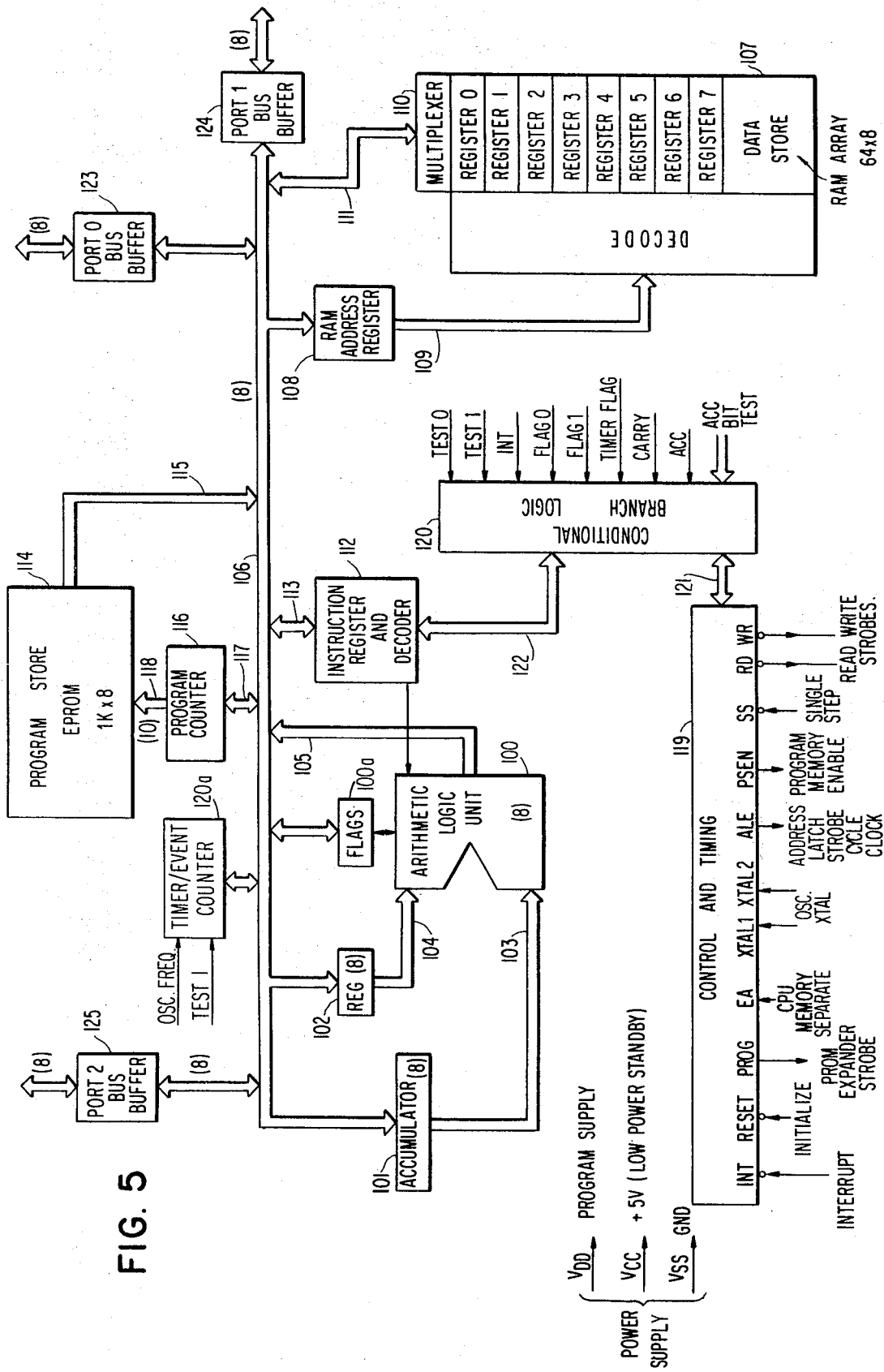
FIG. 5 is a generalized block diagram of a microcomputer used in a digital implementation of the invention.

The method of operation of the invention is illustrated by the flow diagram shown in FIG. 3 of the drawings. The first step in the flow diagram is the balloon labeled START. This may occur, for example, when the power cord of the power tool is plugged in to an AC outlet resulting in the POWER ON condition in the second step of the flow diagram. Once power is applied to the power tool, the tool may be turned on or off with an operator or start switch as in any conventional power tool. Once the operator or start switch has been closed, the first operation to be performed is to monitor the shaft torque of the motor driven shaft which carries the tool implement. The shaft torque can be measured indirectly by measuring the motor current.

Having developed a signal proportional to the motor current, the next operation is to measure the rate of change of the motor current. In purely mathematical terms, this simply amounts to differentiating the motor current with respect to time to obtain a measure of the increase or decrease in motor current. Digitally, the time rate of change is approximated by periodically sampling the motor current and then making a computation among the different current readings. This approximation can be made quite accurate depending on the sampling intervals and the number of significant places of the current reading. As a practical matter, an 8-bit microcomputer having cycle times of 2.5 microseconds or less provides both adequate accuracy and sufficient speed of computation to implement the present invention.

Once the increase or decrease of the motor current has been measured, it is really only necessary to examine the case in which motor current increased. Therefore, the next operation in the flow diagram is to ask whether the rate of change is positive corresponding to an increase in current. If it is not, then, according to the flow diagram, the method of operation of the invention returns to checking the state of the operator switch and monitoring the motor current. However, if the rate of change is positive, that is, an increase in current has been measured, then it is necessary to compare that increase with a threshold value. Now it should be understood that in the normal operation of the power tool, there will be an increase in motor current whenever the tool implement engages a workpiece. This increase in current, however, will be within allowable and predictable limits. Even in the case of an overload condition, the increase in current is still much less in terms of the rate of change than that which occurs in a kickback condition just prior to lockup of the tool implement with the workpiece. In fact, in the overload condition, the power driven tool or other implement continues to cut the workpiece but at a slower speed, with the result that a thermal circuit breaker may be tripped. Neither of these conditions will occur in kickback. Kickback occurs in a such a short period of time that no significant heating takes place such that a thermal relay would trip. The threshold value should be set at a level which will permit detection of a kickback condition in a sufficiently short period of time to allow action to be taken to prevent lockup between the power driven tool and the workpiece. This will vary depending on the motor used, the total inertia of the power tool and the normal operating speed of the tool, but this may be readily established by routine tests for any given power tool. Moreover, the threshold value need not be a preset value but may vary with operating conditions such as speed of the tool.

It is important to note here that while it is desirable to detect a kickback condition in a relatively short period of time, the principle criteria is to detect the kickback condition and take some action such as turning off the power and/or applying a brake in a period of time which is shorter than the period of time it takes for actual lockup of the power driven tool or other implement with the workpiece. With wood as a workpiece, lockup may take place in as short a period of time as 10 milliseconds or as long a period of time as 200 milliseconds or more. Therefore, it is generally sufficient to specify that detection of the kickback condition plus action time to prevent kickback be made in a period of time of less than 10 milliseconds. In a typical implementation, the time it takes to detect a kickback condition can be varied by adjusting the level of a threshold voltage signal. By making the level relatively small, a kickback condition can be detected in a relatively short period of time, but, in addition, there will be a number of false detections which is not desirable. In practical implementations of the invention, this has not been a problem because the threshold level can be set sufficiently high as to avoid false detections and yet detect a kickback condition in a sufficiently short period of time to allow some action to be taken to prevent the kickback.

If the rate of change of the motor current is positive but does not exceed the threshold, the operation of the invention as shown in FIG. 3 is to return to checking the state of the operator switch and then monitoring the motor current. However, if the rate of change of the motor current is both positive and exceeds the threshold, then a kickback condition has been detected. At this point in the method of operation of the invention, the drive to the shaft is stopped and/or a brake is applied. Alternatively, the direction of motion of the shaft may be reversed or the direction of applied torque may be reversed. In electric motor driven tools, particularly hand tools and light-duty bench tools, it is generally sufficient to cease supplying current to the electric motor. On the other hand, in very large industrial equipment driven by polyphase electric motors, it may be necessary to not only stop the drive to the power tool but also apply a brake to the power driven tool or implement. The manner in which this is done is straightforward and conventional. What the invention accomplishes is the detection of the beginning of a kickback condition so that the drive can be stopped or reversed and/or a brake applied to prevent the kickback and thereby avoid injury to the operator. The time frame in which this anti-kickback action must be accomplished is approximately 10 to 100 milliseconds in order to be effective in those applications involving wood as a workpiece.

Once the kickback condition has been detected and the drive to the power tool implement has been stopped, it is desirable to provide some way in which the operator can restart the power tool once the kickback condition has been eliminated. This could be done by providing a separate reset button for the operator to press which would be quite similar to the reset button of a thermal overload relay. However, the preferred embodiment of the present invention contemplates an easier and more natural way in which the operator can restart the drive to the power tool implement. Specifically, as shown in the flow diagram of FIG. 3, the operator restarts the operation by first opening the operator's switch and then closing the operator's switch again. Thus, if the power tool drive stops due to the detection of a kickback condition, the operator does not have to release his grip on the power tool if it is a portable tool but needs only to release a trigger switch and then re-operate the trigger switch once the kickback condition has been cleared. On a bench tool, a simple rocker switch need only be quickly operated. In a stationary machine tool system, a remotely operated start switch may accomplish the same purpose, or any other manual or automatic system might be used.

Now that the general operation of the invention has been described, reference is made to FIG. 4 which illustrates various alternative combinations of sensing and control. Basically, the power tool system may be characterized as comprising an electric motor 11 which is coupled to a tool or other implement 12 by means of a transmission 13. The transmission 13 may be simply a shaft providing direct drive from the motor 11 to the tool or implement 12, a gear train providing speed increase or descrease, or any other coupling device. The kickback sensor 14 derives motor current information from the motor 11.

The rate of change of the motor current is computed and compared with a threshold value to detect an impending kickback condition. When an impending kickback condition is detected, the kickback sensor 14 provides an output to the anti-kickback control device 15. This device is responsive to the output of sensor 14 to remove energy from the implement 12. This can be done by turning off the motor 11 or disengaging a clutch in transmission 13. It may also be necessary to apply a brake to the tool or implement 12 or to the transmission 13. Finally, once the kickback condition has been cleared, the power tool or machine tool system is restarted by an output from reset 16 to either or both of the kickback sensor 14 and the anti-kickback control device 15.

As will be appreciated from the foregoing, the invention may be implemented in many ways depending on the type of power tool or machine tool system and the particular choices of the designer. However, to better illustrate the principles of the invention, a specific example of a practical embodiment of the invention using one of the several commercially available microcomputers will now be described.

Figure 6:
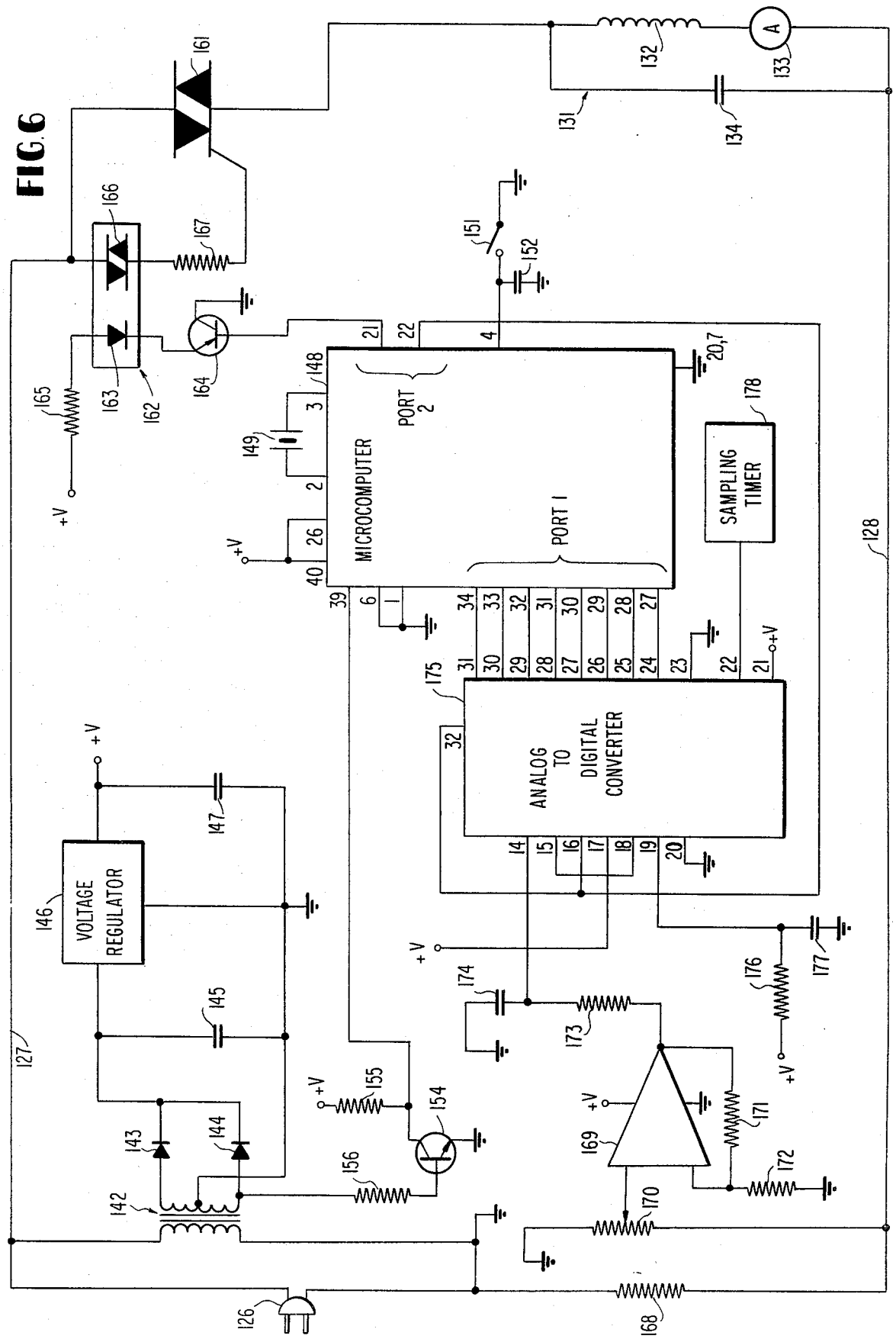
FIG. 6 is a block and schematic diagram of a digital embodiment of the subject invention using the microcomputer shown in FIG. 5.

While the implementation to be described may seem conceptually quite sophisticated, the cost is acutally quite inexpensive because the microcomputers are themselves quite inexpensive and perform the functions of many discrete circuits. Such a digital implementation is shown in FIG. 6 which, in prototype form, uses an Intel 8748 microcomputer but, in a production version, would use an Intel 8048 microcomputer. Both of these microcomputers are part of the Intel MCS-48 microcomputer family, and the principle difference between the 8748 and 8048 microcomputers is that the former has a user programmable and erasable EPROM program memory for prototype developement whereas the latter has a mask programmable ROM program memory for low cost production. Details of the Intel MCS-48 microcomputer family may be obtained by refercing the *MCS-48 ™ Microcomputer Users Manual, published by Intel Corporation,* 3065 Bowers Avenue, Santa Clara, California 95051, copyright 1976 by Intel Corporation.

The Intel 8748 microcomputer, like other microcomputers of its type, is a complete integrated circuit digital computer implemented on a single semiconductor chip. The Intel 8748 microcomputer is illustrated in block diagram form in FIG. 5. The arithmetic section of the processor is comprised of the arithmetic/logic unit (ALC) 100 and associated registers and control circuitry. These include the accumulator 101, temporary register 102, flags 100a and instruction register and decoder 112. In a typical operation, data stored in accumulator 101 is combined in the ALU 100 with data from another source on the internal bus 106 temporarily stored in register 102, and the result is stored in the accumulator 101 or some other register. The operation code portion of each program instruction stored in program store 114 is transferred under the control of program counter 116 via memory bus 115, internal bus 106 and eight lines represented by numeral 113 to the instruction register and decoder 112 where it is stored and converted to outputs which control the function of the arithmetic section. The ALU 100 accepts 8-bit data words from the accumulator 101 over eight lines represented by numeral 103 and from the register 102 over eight lines represented by numeral 104 and provides an 8-bit data word output to internal bus 106 via eight lines represented by numeral 105. Under the control of the instruction register and decoder 112, the ALU 100 can perform various functions including add with or without carry, AND, OR and Exclusive OR, increment or decrement, bit complement and rotate left or right among others. If the operation performed by the ALU results in a value represented by more than 8 bits, a flag is set in flags 100a. The accumulator 101 is one of the sources of input to the ALU 100 and often the destination of the result of operations performed by the ALU via internal bus 106. Data to and from the input/output port buffer registers 123, 124 and 125 and data memory 107 often passes through the accumulator as well.

The program memory 114 consists of 1024 words of 8 bits each which are addressed by the program counter 116 via ten address lines represented by numeral 118. The program counter 116 is itself connected to internal bus 106 by eight lines represented by numeral 117. Program memory 114 in the Intel 8748 microcomputer is an erasable and programmable read-only memory (EPROM), while in the Intel 8048, it is a mask programmable ROM. The data memory 107 is a random access memory (RAM) consisting of 64 words of 8 bits each. The first eight locations (0–7) of the data memory 107 are designated as working registers and are directly addressable by several instructions and are usually used to store frequently accessed intermediate results. The position in data memory 107 where a data word is stored is determined by address register 108 which is loaded by internal bus 106 and connected by eight lines indicated by numeral 109 to the decode section of data memory 107. Address register 108 also addresses data which is to be read out of data memory 107 via multiplexer 110 and eight lines indicated by numeral 111 to internal bus 106. In this manner, for example, operands can be read out of data memory 107 and temporarily stored in accumulator 101 or register 102 prior to an operation being performed by ALU 100.

The Intel 8048 microcomputer has 27 lines which can be used for input and/or output functions, and these lines are grouped as three ports of eight lines each and three "test" inputs which can alter program sequences. The three ports are identified as port 0, port 1 and port 2 and are provided with buffer registers 123, 124 and 125, respectively, which are connected to internal bus 106. Ports 1 and 2 have identical characteristics and the lines of these ports are call quasi-bidirectional because of the special output circuit structure which allows each line to serve as an input, an output, or both even though outputs are statically latched. Port 0 is a true bidirectional port with associated input and output strobes. The three "test" inputs to the conditional branch logic 120 and timer/event counter 120a allow inputs to cause program branches under program control without the necessity of loading an input port into the accumulator.

The program counter 116 is an independent counter while the program counter stack is implemented using pairs of registers in the data memory 107. The ten bits of the program counter 116 are used to address the 1024 words of the program memory 114. The program counter is initialized to zero by activating the reset line to the control and timing circuits 119. An interrupt to the control and timing circuits 119 or a call to a subroutine in the main program causes the contents of the program counter 116 to be stored in one of the eight register pairs of the program counter stack in data memory 107. The pair to be used is determined by a three bit stack pointer. The stack pointer when initialized to 000 points to locations 8 and 9 in data memory 107. The first subroutine jump or interrupt results in the program counter contents being transferred to locations 8 and 9, and the stack pointer is then incremented by one to point to locations 10 and 11 in anticipation of another subroutine call. Nesting of subroutines within subroutines can continue up to eight times without overflowing the stack. The end of the subroutine causes the stack pointer to be decremented and the contents of the resulting register pair to be transferred to the program counter 116.

An interrupt sequence is initiated by applying a low "0" level to the interrupt input of the control and timing circuits 119. The interrupt line is sampled every machine cycle and, when detected, causes a "jump to subroutine" at location 3 in the program memory as soon as all cycles of the current instruction are complete. As in any call to subroutine, the program counter contents are saved in the stack. Program memory location 3 contains an unconditional jump to an interrupt service subroutine elsewhere in the program memory.

The timer/event counter 120a is used to count external events and generate accurate time delays. The counter is an eight bit binary counter which is presettable and readable with two instructions which transfer the contents of the accumulator 101 to the counter 120a via bus 106 and vice versa. Once started, the counter 120a will increment to its maximum count and overflow until stopped by a stop timer counter instruction or reset. An overflow results in setting an overflow flag and in the generation of an interrupt request. The timer interrupt may be enabled or disabled independently of the external interrupt by appropriate instructions. If enabled, the counter overflow will cause a subroutine call to location 7 where the timer or counter service routine may be stored. If timer and external interrupts occur simultaneously, the external source will be recognized.

Timing generation is self-contained with the exception of a frequency reference which can be a crystal, series RC circuit or external clock source applied to the XTAL inputs of the control and timing circuits 119. Basically, these circuits can be divided into the following functional blocks: on-board oscillator, state counter and cycle counter. The output of the oscillator is divided by three in the state counter to create a clock. The clock is then divided by five in the cycle counter to define a machine cycle consisting of five machine states.

The conditional branch logic 120 which communicates with the control and timing circuits 119 via lines 121 and the instruction register and decoder 112 via lines 122 enables several conditions internal and external to the processor to be tested by the users program.

The operation of the microcomputer shown in FIG. 5 is conventional. The activities of the microcomputer are controlled by an internal clock and typically involve the fetching of an instruction, performance of the operation required, fetching the next instruction and so forth as specified in the program stored in program memory 114. Program counter 116 contains the address of the next program instruction, and the program counter is updated by incrementing the counter each time it fetches an instruction. The instructions are stored in program memory 114 in a sequential order, except where the program branches. In this event, a jump instruction containing the address of the instruction which is to follow it is stored in program memory 114. This address is also loaded into program counter 116 which is again incremented after the branch has been executed. When a subroutine is called by the main program, the contents of program counter 116 are stored in two of the sixteen registers numbered 8 through 24 in data memory 107 which, as described before, are called the program stack. The sub-routine is simply a program within a program and is typically used when a set of instructions must be executed repeatedly in the course of a main program. By storing the contents of program counter 116 in two of the registers of data memory 107, the computer can return to the main program at the end of the sub-routine by replacing the contents of program counter 116 with the contents previously stored in two of the registers of data memory 107.

Referring now to FIG. 6, a power plug 126 is adapted to be plugged into an AC outlet and is provided with power lines 127 and 128. Power line 127 is connected to one of the main terminals of triac 161. The other main terminal of triac 161 is connected to motor 131. Motor 131 is a universal electric motor comprising a field 132 connected in series with an armature 133 and having a switching noise suppression capacitor 134 connected in parallel with the series connection of field 132 and armature 133. The common junction of armature 133 and capacitor 134 are connected to power line 128.

A gate control circuit 162 supplies gating pulses to triac 161. This circuit 162 comprises an opto-coupler. The opto-coupler package includes a light emitting diode (LED) 163 having its anode connected through resistor 165 to a source of positive voltage +V. In the same package with LED 163 is a photo gated triac 166 having one terminal connected through resistor 167 to the gate of triac 161 and the other termainal connected directly to power line 127. The cathode of LED 163 is connected to the emitter of PNP transistor 164, the collector of which is grounded. In operation, when LED 163 is biased to conduction by the conduction of transistor 164, triac 166 conducts to provide a gating signal to triac 161 causing the triac to conduct supplying current to motor 131.

The DC power supply which develops the supply voltage for the various circuits used in the FIG. 6 embodiment comprises a transformer 142 having its primary connected across power lines 127 and 128. The center tapped secondary winding of transformer 142 is connected to a full-wave rectifier comprising diodes 143 and 144, the center tap being connected to system common. A filter capacitor 145 is connected from the output of the full-wave recitifier to system common. A series voltage regulator 146 is connected between the output of the full-wave recitifier and the regulated output of the power supply indicated as +V. Voltage regulator 146 may be, for example, a type MC78MO5C regulator manufactured by Motorola Semiconductor Products, Inc. A further filter capacitor 147 is connected across the output of regulator 146 and system common.

The heart of the system shown in FIG. 6 is microcomputer 148 which is illustrated in FIG. 5. This computer is fabricated as an integrated circuit having a total of 40 pin connectors. Pins 27–34 comprise the 8-bit port 1, while pins 21–24 and 35–38 comprise the 8-bit port 2, of which only pins 21 and 22 are used. Pins 12–19 comprise the 8-bit bus port 0 which is not used in this embodiment. Pins 2 and 3 are connected to an external crystal 149 which supplies a 6 MHz timing reference. The regulated +V from the power supply is connected to pins 40 and 26, while pins 20 and 7 are connected to system common. An analog-to-digital converter 175, to be described in more detail hereinafter is connected to pins 27 to 34 which comprise port 1 of microcomputer 148. The analog-to-digital converter 175 may be an ADC0816 integrated circuit manufactured by National Semiconductor, in which case pins 24 to 31 of converter 175 are connected respectively to pins 27 to 34 of microcomputer 148. In the embodiment shown in FIG. 6, a keyboard, a multiposition switch or other device (not shown) may be connected to the eight pins which comprise port 0. The purpose of this keyboard would be to provide the operator with the ability to select desired speeds of operation. This is an advantageous feature when the power tool is to be used to cut various types of workpiece materials and avoids the necessity of mechanical speed changing devices. Pin 21 of port 2 is connected to the base of transistor 164, and pin 22 of port 2 is connected to pins 16 and 32 of analog-to-digital converter 175. These pins of analog-to-digital converter are command inputs. An operator or start switch 151 is connected between system common and pin 4, and a capacitor 152 connects the same pin 4 to common. Thus, when switch 151 is closed, a low potential is provided to pin 4, and when switch 151 is opened, a rising voltage is supplied to pin 4. Alternatively, power can be removed from the microcomputer allowing the automatic power on reset circuit contained in the microcomputer to be used. Pins 6 and 1 are connected to gound.

In order to measure motor current, a low valued, high wattage resistor 168 is inserted in series between power line 128 and line plug 126. This provides a voltage drop proportional to the motor current, and it is this voltage drop which is measured by operational amplifier 169. More specifically, the junction of the power line 128 and resistor 168 is connected to one end of the winding of potentiometer 170, the other end of the winding being connected to system common as is the junction between resistor 168 and plug 126. The wiper of potentiometer 170 is connected to the positive input of operational amplifier 169. Positioning the wiper of potentiometer 170 controls the sensitivity of the current measurement. Negative feedback for the operational amplifier 169 is provided by a resistor 171 connected between the output and negative input of the amplifier and a resistor 172 connected between the negative input of the amplifier and ground.

The output of operational amplifier 169 is supplied through an RC filtering circuit comprising resistor 173 and capacitor 174 to the analog-to-digital converter 175. The +V regulated voltage from the DC power supply is connected to pins 17 and 21 of converter 175, while pins 20 and 23 are connected to ground. The +V regulated voltage is also connected to pin 19 through resistor 176, the junction of resistor 176 and pin 19 being connected through a filter capacitor 177 to ground. Pins 15 and 18 are connected together, while the junction of resistor 173 and capacitor 174 is connected to pin 14.

When the microcomputer 148 sends a start signal from pin 22 to the analog-to-digital converter at pin 32 the analog-to-digital converter begins its conversion of voltage input to digital output using sampling timer 178 as an external time reference. After 100 microseconds, the microcomputer reads the digital output from the analog-to-digital converter. The 8-bit output of converter 175 is provided at pins 24 thru 31 which are connected to pins 27 to 34 of port 1 of the microcomputer.

Zero crossing information is generated by a transistor 154 having its emitter connected to chassis ground and its collector connected to pin 39 of microcomputer 148 and through pull-up resistor 155 to the regulated +V output of the DC power supply. The base of transistor 154 is connected via resistor 156 to one end of the secondary winding of transformer 142.

Figure 7A:
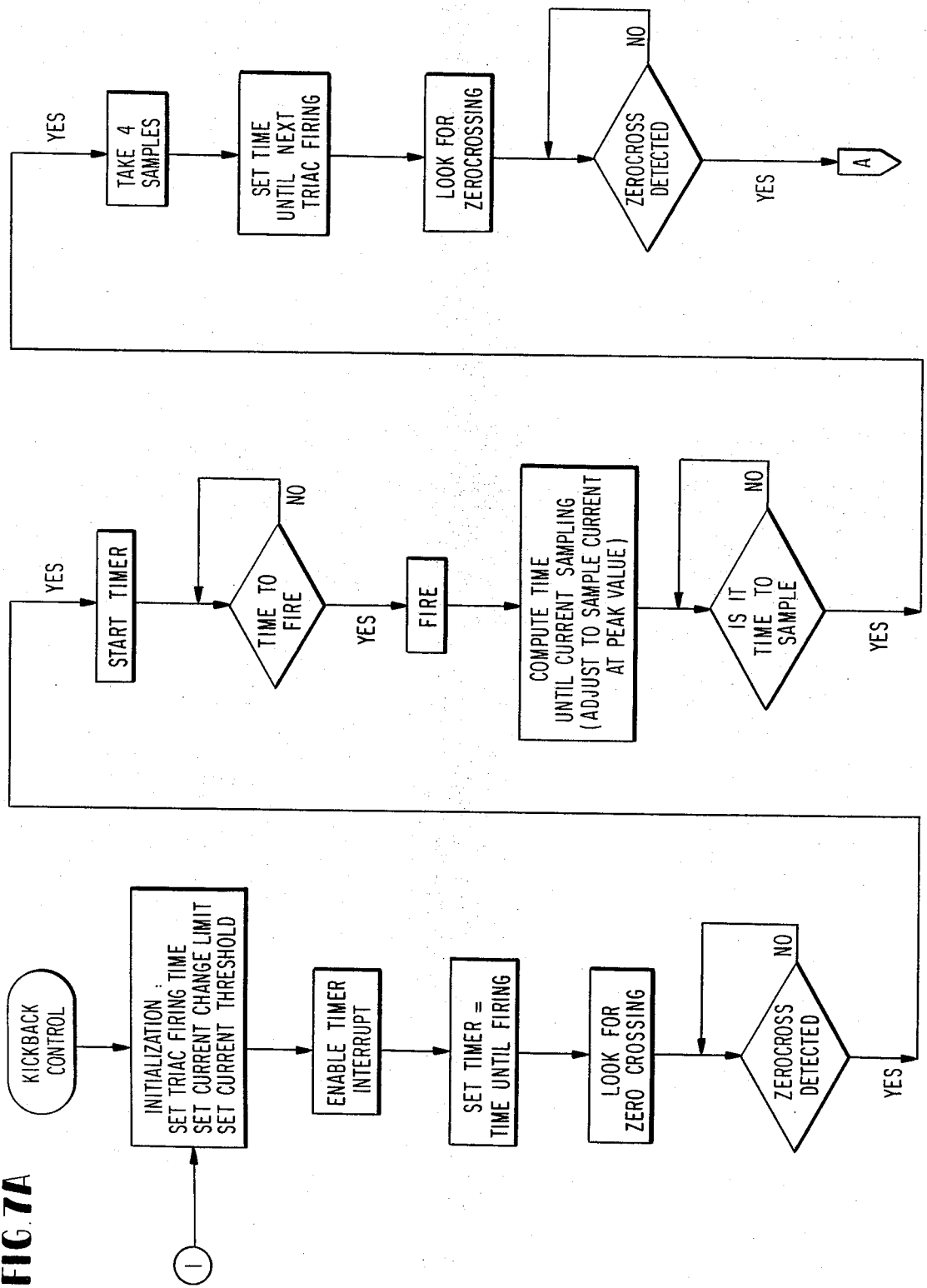
FIGS. 7A and 7B are flow diagrams of the program used in the microcomputer of the digital embodiment shown in FIG. 6.
Figure 7B:
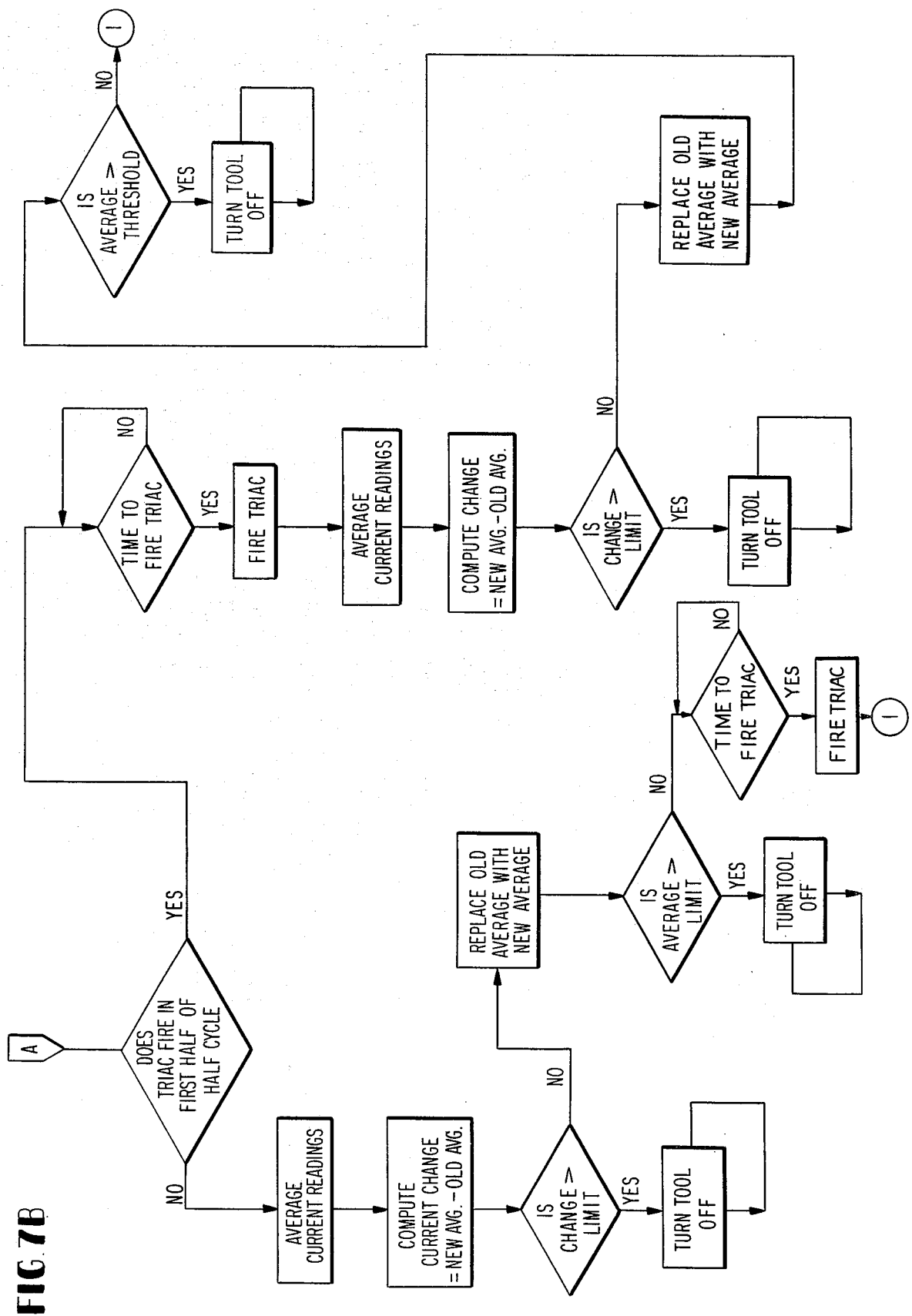

The flow diagrams for the microcomputer program are shown in FIGS. 7A and 7B. These two figures represent a single flow diagram formed by connecting the numbered connectors. The kickback control begins with an initialization of counters and registers to set the triac firing time, the current change limit and the current threshold. The triac firing time controls the speed of the motor. The current change limit is the threshold against which the computed rate of change of current is compared to detect an impending kickback condition. The current threshold is used to detect an overload condition as distinguished from an impending kickback condition. Once this initialization is completed, the timer interrupt is enabled so that the timer can be set to the triac firing time. The program then waits for a line zero crossing. This information is provided at pin 39 of the microcomputer by transistor 154. When a line zero crossing is detected, the timer begins to count down, and when a zero count is reached, a command to fire the triac 161 is given on pin 21 to the base of transistor 164. Then the time until current sampling is computed. This time is adjusted to sample the current at its peak value or any other determinate point in the current waveform.

When it is time to sample the current, a read out command is generated at pin 22 of the microcomputer. This command is repeated, for example, four times in succession at 40 microsecond intervals so that four current samples are read out of analog-to-digital converter 175 to port 1 of the microcomputer. These four samples are temporarily stored, and the timer is reset for the next triac firing.

The program then waits for the next zero crossing and, with reference to FIG. 7B, if the triac fires in the second half of this half cycle, the four current samples which were temporarily stored are averaged or subjected to other mathematical manipulations to improve accuracy. Then the change in current is computed by subtracting the old current from the just computed new current. If the difference is positive and exceeds the current change limit which was initially set or computed, an impending kickback condition has been detected and the tool is turned off. On the other hand, if the current change limit is not exceeded, the old current is replaced with the new current. At this point an additional test is performed by the specific program illustrated. This is to compare the current which has been measured with an initially set current threshold to determine if an overload condition exists. If so, the tool is turned off. Otherwise, the triac is fired at the firing time, and the program returns to its beginning as shown in FIG. 7A.

Assume, however, that the triac fires in the first half instead of the first half of each half cycle. Then as shown in FIG. 7B, the triac is first fired and then computations of current, impending kickback condition and overload condition are made.

Attached hereto as an appendix is a computer printout of the assembly language program depicted in FIGS. 7A and 7B for the 8748 microcomputer used in the circuit shown in FIG. 6.

One particular advantage of measuring current to detect an impending kickback condition is that the power tool control could be remote from the tool itself possibly in the form of an adapter interposed between the AC outlet and the power tool line cord. With such an adapter, the firing of the triac or SCRs would not be controlled by the microcomputer, and the detection of an impending kickback condition could result in the tripping of a power relay to disconnect the power tool from the AC power source, the relay then being manually reset by a push button.

The description of the digital implementation shown in FIG. 6 is given to illustrate a specific preferred embodiment and should not be construed as a limitation to the practice of the invention. Those skilled in the art will recognize that other commercially available microcomputers could be used based on the teachings set forth hereinabove. Among those microcomputers which are considered to be especially suited to the commercial practice of the invention are the 3870 microcomputer manufactured by Mostek Corporation, Motorola Semiconductor Products, Inc., and Fairchild Camera and Instrument Corp. and the 8085A microcomputer manufactured by Intel Corporation. However, there are many other equivalent microcomputers now on the market and others can be expected to be commercially introduced in the future.

APPENDIX

```
LOC   OBJ        SEQ          SOURCE STATEMENT 1
0000              2            ORG      0
                  3
                  4  ;
                  5  ;TTV5 DOES KICKBACK DETECTION
                  6  ;AND CONTROL
                  7  ;
                  8  TRIAC    MACRO
                  9
                 10           LOCAL  LINE
                 11           MOV    A,#252       ;MACRO TRIAC GIVES A
                              00 MICROSECOND
                 12           OUTL   P2,A         ;PULSE FROM PROCESSOR
                              PIN 22.
                 13  LINE:    DJNZ   R5,LINE
                 14           MOV    A,#253
                 15           OUTL   P2,A
                 16           ENDM
                 17
                 18
```

| LOC | OBJ | SEQ | | SOURCE STATEMENT | |
|---|---|---|---|---|---|
| | | 19 | COMPAR | MACRO X,Y | |
| | | 20 | | | |
| | | 21 | | MOV A,X | ;COMPAR SUBTRACTS X FROM Y. |
| | | 22 | | CPL A | ;X AND Y AREN'T ALTERED |
| | | 23 | | ADD A,Y | |
| | | 24 | | CPL A | ;RESULT IS IN A. |
| | | 25 | | ENDM | |
| | | 26 | | | |
| 0000 | 0409 | 27 | | JMP START | |
| 0002 | 00 | 28 | | NOP | |
| 0003 | 00 | 29 | | NOP | |
| 0004 | 00 | 30 | | NOP | |
| 0005 | 00 | 31 | | NOP | |
| 0006 | 00 | 32 | | NOP | |
| 0007 | 04B5 | 33 | | JMP INT | ;INTERRUPT VECTOR ADDRESS |
| | | 34 | | | |
| | | 35 | | | |
| 0009 | 95 | 36 | START: | CPL F0 | |
| 000A | B5 | 37 | | CPL F1 | |
| | | 38 | | | |
| 000B | D5 | 39 | | SEL RB1 | |
| 000C | B808 | 40 | | MOV R0,#8 | |
| | | 41 | | | |
| 000E | C5 | 42 | | SEL RB0 | |
| 000F | BAFF | 43 | | MOV R2,#255 | |
| 0011 | BEFF | 44 | | MOV R6,#255 | |
| | | 45 | | | |
| 0013 | BB1E | 46 | HERE: | MOV R3,#30 | ;SET TRIAC FIRING TIME |
| | | 47 | | | ;NOTE THAT TRIAC FIRING 60 |
| | | 48 | | | ;MICROSECONDS AFTER THIS TIME. |
| | | 49 | | | |
| 0015 | BD0A | 50 | | MOV R5,#10 | |
| 0017 | 23FF | 51 | | MOV A,#255 | ;PUT PORT 1 IN INPUT MODE. |
| 0019 | 39 | 52 | | OUTL P1,A | |
| | | 53 | | | |
| | | 54 | | | |
| 001A | 25 | 55 | | EN TCNTI | ;ENABLE TIMER/COUNTER INTERRUPT. |
| 001B | 65 | 56 | | STOP TCNT | ;INITIALIZE THE CLOCK. |
| | | 57 | | | |
| | | 58 | | | |
| | | 59 | | | |
| 001C | FB | 60 | | MOV A,R3 | ;LOAD TIME UNTIL TRIAC FIRING. |
| 001D | 37 | 61 | | CPL A | |
| 001E | 62 | 62 | | MOV T,A | |
| 001F | 561F | 63 | CROSS: | JT1 CROSS | ;TEST FOR ZERO CROSSING. |
| 0021 | 4621 | 64 | CROSS2: | JNT1 CROSS2 | |
| | | 65 | | | |
| | | 66 | | | |
| 0023 | 55 | 67 | | STRT T | ;START TIMER. |
| | | 68 | | | |
| | | 69 | | | |
| | | 70 | | | |
| 0024 | D5 | 71 | | SEL RB1 | |
| 0025 | E828 | 72 | | DJNZ R0,X | |
| 0027 | A5 | 73 | | CLR F1 | |
| | | 74 | | | |
| 0028 | C5 | 75 | X: | SEL RB0 | |
| 0029 | EE2C | 76 | | DJNZ R6,WAIT | |
| 002B | 85 | 77 | | CLR F0 | ; |
| | | 78 | | | |
| | | 79 | | | |
| | | 80 | | | |

| LOC OBJ | SEQ | SOURCE STATEMENT | |
|---|---|---|---|
| 002C 00 | 81 | WAIT: NOP | ;WAIT FOR INTERRUPT |
| 002D 042C | 82 | JMP WAIT | |
| | 83 | ;************************************************************** | |
| | 84 | | ;THIS IS THE TIMER INTERRUPT SERVICE ROUTINE |
| | 85 | | ;RETURN ADDRESS. |
| | 86 | ;************************************************************** | |
| 002F 35 | 87 | DISAB: DIS TCNTI | |
| | 88 | | |
| | 89 | | |
| 0030 1634 | 90 | GOSTRT: JTF STRTAD | ;LOOK FOR TIMER FLAG. |
| 0032 0430 | 91 | NOTYET: JMP GOSTRT | |
| | 92 | | |
| 0034 BF04 | 93 | STRTAD: MOV R7,#4 | ;COUNTING REGISTER. |
| 0036 B930 | 94 | MOV R1,#30H | |
| 0038 2303 | 95 | MARK: MOV A,#3 | ;START A-TO-D. |
| 003A 3A | 96 | OUTL P2,A | |
| 003B 2301 | 97 | MOV A,#1 | |
| 003D 3A | 98 | OUTL P2,A | |
| 003E 00 | 99 | NOP | |
| 003F 00 | 100 | NOP | |
| 0040 09 | 101 | SAMPLE: IN A,P1 | ;READ THE A-TO-D. |
| 0041 02 | 102 | OUTL BUS,A | |
| 0042 00 | 103 | NOP | |
| 0043 A1 | 104 | MOV @R1,A | |
| 0044 19 | 105 | INC R1 | |
| 0045 00 | 106 | NOP | |
| 0046 00 | 107 | NOP | |
| 0047 EF38 | 108 | DJNZ R7,MARK | |
| 0049 FB | 109 | MOV A,R3 | ;LOAD TIME UNTIL TRIAC FIRING IN |
| | 110 | | ;THE SECOND HALF CYCLE |
| 004A 37 | 111 | CPL A | |
| | 112 | | |
| | 113 | | |
| 004B 464B | 114 | CROSS3: JNT1 CROSS3 | ;LOOK FOR NEXT ZERO CROSSING. |
| 004D 564D | 115 | CROSS4: JT1 CROSS4 | |
| 004F 62 | 116 | MOV T,A | ;COUNT DOWN TIME TO TRIAC FIRING. |
| | 117 | | |
| | 118 | COMPAR R3,#26 | ;DOES TRIAC FIRE IN FIRST OR SECOND |
| | 119+ | | |
| 0050 FB | 120+ | MOV A,R3 | ;COMPAR SUBTRACTS X FROM Y. |
| 0051 37 | 121+ | CPL A | ;X AND Y AREN'T ALTERED |
| 0052 031A | 122+ | ADD A,#26 | |
| 0054 37 | 123+ | CPL A | ;RESULT IS IN A. |
| | 124 | | ;HALF OF HALF CYCLE? |
| | 125 | | |
| | 126 | | |
| 0055 F684 | 127 | JC DOLATE | |
| | 128 | | |
| | 129 | | |
| 0057 FC | 130 | MOV A,R4 | |
| 0058 AA | 131 | MOV R2,A | ;PUT OLDAVG IN R2. |
| | 132 | | |
| 0059 14CC | 133 | CALL AVERAG | ;AVERAGE THE A-TO-D READINGS. |
| | 134 | | |
| 005B 766B | 135 | JF1 X2 | ;IS CHANGE IN CURRENT RN-OFF DISABLED? |
| | 136 | COMPAR R4,R2 | ;NEWAVG - OLDAVG = CHANGE. |
| | 137+ | | |
| 005D FC | 138+ | MOV A,R4 | ;COMPAR SUBTRACTS X FROM Y. |

```
LOC  OBJ        SEQ         SOURCE STATEMENT 005E 37         139+        CPL  A              ;X AND Y AREN'T ALTER
005F 6A         140+        ADD  A,R2
0060 37         141+        CPL  A              ;RESULT IS IN A.
                142                             ;NEWAVG = R4;  OLDAVG
                            R2.
0061 F66B       143         JC   X2
                144
0063 AD         145         MOV  R5,A           ;R5 = CHANGE.
                146         COMPAR #5,R5        ;IS CHANGE GREATER TH
                            THE FIXED VALUE?
                147+
0064 2305       148+        MOV  A,#5                    ;COMPAR SUBTR
                            S X FROM Y.
0066 37         149+        CPL  A              ;X AND Y AREN'T ALTER
0067 6D         150+        ADD  A,R5
0068 37         151+        CPL  A              ;RESULT IS IN A.
0069 F6B3       152         JC   OFF1           ;IF SO, TURN TOOL OFF
                153
006B B674       154 X2:     JF0  SET1
                155         COMPAR #200,R4      ;DOES THE AVERAGE E
                            ED THE THRESHOLD?
                156+
006D 23C8       157+        MOV  A,#200                  ;COMPAR SUBTR
                            S X FROM Y.
006F 37         158+        CPL  A              ;X AND Y AREN'T ALTER
0070 6C         159+        ADD  A,R4
0071 37         160+        CPL  A              ;RESULT IS IN A.
0072 F6B1       161 CHECK1: JC       OFF        ;TURN THE TOOL OFF!
                162
                163
0074 BD0A       164 SET1:   MOV  R5,#10
0076 167A       165 HERE2:  JTF  TRIME
0078 0476       166         JMP  HERE2
                167
                168
                169 TRIME:  TRIAC
007A 23FC       170+        MOV  A,#252         ;MACRO TRIAC GIVES
                            00 MICROSECOND
007C 3A         171+        OUTL P2,A           ;PULSE FROM PROCESS
                            PIN 22.
007D ED7D       172+??0001: DJNZ R5,??0001
007F 23FD       173+        MOV  A,#253
0081 3A         174+        OUTL P2,A
                175
                176
0082 0413       177         JMP  HERE
                178
                179
0084 BD0A       180 DOLATE: MOV  R5,#10
                181
                182
0086 168A       183 DOL:    JTF      HERE3
0088 0486       184         JMP      DOL
                185
                186
                187 HERE3:  TRIAC
008A 23FC       188+        MOV  A,#252         ;MACRO TRIAC GIVES
                            00 MICROSECOND
008C 3A         189+        OUTL P2,A           ;PULSE FROM PROCESS
                            PIN 22.
008D ED8D       190+??0002: DJNZ R5,??0002
008F 23FD       191+        MOV  A,#253
0091 3A         192+        OUTL P2,A
                193
                194
0092 FC         195         MOV  A,R4
0093 AA         196         MOV  R2,A           ;PUT OLDAVG IN R2.
                197
0094 14CC       198         CALL     AVERAG     ;AVERAGE THE A-TO-D
                            ADINGS.
                199
```

| LOC | OBJ | SEQ | SOURCE STATEMENT |
|---|---|---|---|

```
0096 76A6      200          JF1 X3
               201          COMPAR R4,R2    ;NEWAVG - OLDAVG = CH
                                            E.
               202+
0098 FC        203+         MOV A,R4                ;COMPAR SUBTF
                                            S X FROM Y.
0099 37        204+         CPL A           ;X AND Y AREN'T ALTEF
009A 6A        205+         ADD A,R2
009B 37        206+         CPL A           ;RESULT IS IN A.
009C F6A6      207          JC X3
               208
009E AD        209          MOV R5,A
               210          COMPAR #5,R5    ;COMPAR CHANGE WITH FI
                                            L.
               211+
009F 2305      212+         MOV A,#5                ;COMPAR SUBTF
                                            S X FROM Y.
00A1 37        213+         CPL A           ;X AND Y AREN'T ALTEF
00A2 6D        214+         ADD A,R5
00A3 37        215+         CPL A           ;RESULT IS IN A.
00A4 F6B3      216          JC OFF1         ;IF CHANGE EXCEEDS FI
                                            L, TURN THE
               217                          ;TOOL OFF.
00A6 B6AF      218 X3:      JF0 SET2
               219          COMPAR #200,R4  ;DOES THE AVERAGE EXCE
                                            THE THRESHOLD?
               220+
00A8 23C8      221+         MOV A,#200              ;COMPAR SUBTF
                                            S X FROM Y.
00AA 37        222+         CPL A           ;X AND Y AREN'T ALTEF
00AB 6C        223+         ADD A,R4
00AC 37        224+         CPL A           ;RESULT IS IN A.
00AD F6B1      225 CHECK2:  JC OFF          ;TURN THE TOOL OFF!!!
               226
00AF 0413      227 SET2:    JMP HERE
               228
               229
               230
00B1 04B1      231 OFF:     JMP OFF         ;CURRENT EXCEEDED
                                            SHOLD LEVEL.
               232
00B3 04B3      233 OFF1:    JMP OFF1        ;CHANGE IN CURRENT E
                                            EEDED THRESHOLD.
               234
               235
               236                          ;TRIAC FIRING
               237                          ;INTERRUPT SERVICE S
                                            ROUTINE
00B5 16B7      238 INT:     JTF NEXT        ;RESET TIMER FLAG.
               239
               240 NEXT:    COMPAR #52,R3   ;COMPUTE THE TIME TI
                                            SAMPLING.
               241+
00B7 2334      242+         MOV A,#52               ;COMPAR SUBTRA
                                            S X FROM Y.
00B9 37        243+         CPL A           ;X AND Y AREN'T ALTERI
00BA 6B        244+         ADD A,R3
00BB 37        245+         CPL A           ;RESULT IS IN A.
               246
00BC 67        247          RRC A           ;DIVIDE BY TWO--- SAMPI
                                            CURRENT AT PEAK VALUE.
00BD 37        248          CPL A
00BE 62        249          MOV T,A         ;COUNT DOWN THE TIME
                                            NTIL THE A-TO-D
               250                          ;READING IS TAKEN.
               251
               252
               253          TRIAC
00BF 23FC      254+         MOV A,#252      ;MACRO TRIAC GIVES A
                                            00 MICROSECOND
00C1 3A        255+         OUTL P2,A       ;PULSE FROM PROCESSO
```

```
LOC   OBJ       SEQ         SOURCE STATEMENT
                PIN 22.
00C2  EDC2      256+??0003:  DJNZ R5,??0003
00C4  23FD      257+         MOV A,#253
00C6  3A        258+         OUTL P2,A
                259
                260
                261
00C7  B808      262          MOV R0,#8        ;PUT DESIRED RETURN AI
                     ESS
00C9  B02F      263          MOV @R0,#DISAB   ;ON STACK.
00CB  93        264          RETR
                265
                266
                267
                268
                269                           ;AVERAG ADDS THE FOUR
                     LUES
                270                           ;LOCATED IN RAM 33H,3
                     31H
                271                           ;AND 30H.   THEN THE
                     N IS
                272                           ;DETERMINED.
                273
                274
                275
00CC  BF02      276  AVERAG: MOV R7,#2        ;COUNTING REGISTER
00CE  27        277          CLR A
00CF  C9        278  SUM1:   DEC R1
                279
00D0  61        280          ADD A,@R1
00D1  EFCF      281          DJNZ R7,SUM1
                282
00D3  67        283          RRC A
00D4  AD        284          MOV R5,A         ;STORE SUM1 IN R5.
                285
00D5  BF02      286          MOV R7,#2        ;COUNTING REGISTER
                287
00D7  27        288          CLR A
00D8  C9        289  SUM2:   DEC R1
00D9  61        290          ADD A,@R1
00DA  EFD8      291          DJNZ R7,SUM2
                292
00DC  67        293          RRC A
                294
00DD  6D        295  AVG:    ADD A,R5
00DE  67        296          RRC A            ;DIVIDE BY TWO.
00DF  AC        297          MOV R4,A         ;R4 CONTAINS THE AVEI
                     OF
                298                           ;FOUR VALUES.
                299
00E0  02        300          OUTL BUS,A
                301
00E1  83        302          RET
                303
                304          END

USER SYMBOLS
AVERAG  00CC    AVG    00DD    CHECK1  0072    CHECK2  00AD
COMPAR  0002    CROSS  001F    CROSS2  0021    CROSS3  004B
CROSS4  004D    DISAB  002F    DOL     0086    DOLATE  0084
GOSTRT  0030    HERE   0013    HERE2   0076    HERE3   008A
INT     00B5    MARK   0038    NEXT    00B7    NOTYET  0032
OFF     00B1    OFF1   00B3    SAMPLE  0040    SET1    0074
SET2    00AF    START  0009    STRTAD  0034    SUM1    00CF
SUM2    00D8    TRIAC  0000    TRIME   007A    WAIT    002C
X       0028    X2     006B    X3      00A6

ASSEMBLY COMPLETE, NO ERRORS
```

What is claimed is:

1. A method of detecting an impending kickback condition in a power tool of the type having an implement driven by an electric motor, said electric motor being supplied with current from an AC source, the method comprising the steps of:

(a) sampling successive periods of the current through said motor at determinate points in the current waveform;
(b) filtering the sampled values of motor current;
(c) measuring the rate of change of the results of said step of filtering;
(d) comparing the measured rate of change with a threshold to detect an impending kickback condition.

2. The method of detecting an impending kickback condition as recited in claim 1 wherein the current samples taken in said step of sampling are taken in the vicinity of the peak current value during at least each cycle of said AC source.

3. The method of detecting an impending kickback condition as recited in claim 1 wherein said electric motor is supplied with current from said AC source through an electronic switching circuit which is turned on each half cycle of said AC source, the step of sampling being performed at a time measured from when said electronic switching current is turned on.

4. The method of detecting an impending kickback condition as recited in claim 1 wherein said step of filtering is performed by averaging the samples.

5. The method of detecting an impending kickback condition as recited in claim 1 further comprising the step of setting said threshold.

6. A method of eliminating kickback in a power tool of the type having an implement driven by an electric motor, said electric motor being supplied with current from an AC source, the method comprising the steps of:
(a) sampling successive periods of the current through said motor at determinate points in the current waveform;
(b) filtering the sampled values of motor current;
(c) measuring the rate of change of the results of said step of filtering;
(d) comparing the measured rate of change with a threshold; and
(e) inhibiting the supply of current to said motor if the measured rate of change exceeds said threshold.

7. The method of eliminating kickback in a power tool as recited in claim 6 wherein the current samples taken in said step of sampling are taken in the vicinity of the peak current value during at least each cycle of said AC source.

8. The method of eliminating kickback in a power tool as recited in claim 6 wherein said electric motor is supplied with current from said AC source through an electronic switching circuit which is turned on each half cycle of said AC source, the step of sampling being performed at a time measured from when said electronic switching circuit is turned on.

9. The method of eliminating kickback in a power tool as recited in claim 6 wherein said step of filtering is performed by averaging the samples.

10. The method of eliminating kickback in a power tool as recited in claim 6 further comprising the step of applying a brake to stop the motion of said tool or other implement if the measured rate of change of current exceeds said threshold.

11. The method of eliminating kickback in a power tool as recited in claim 6 further comprising the step of setting said threshold.

12. A method of eliminating kickback in a power tool of the type having a rotary shaft connected to drive an implement and an electric motor coupled to said rotary shaft to impart a rotary motion thereto, said electric motor being periodically supplied with current through an electronic switching circuit, the method comprising the steps of:
(a) sampling successive periods of the current through said motor at determinate points in the current waveform generated by said electronic switching circuits;
(b) filtering the sampled values of motor current;
(c) measuring the rate of change of the results of said step of filtering;
(d) comparing the measured rate of change with a threshold; and
(e) controlling said electronic switching circuit to block the supply of current to said electric motor if the measured rate of change exceeds said threshold.

13. The method of eliminating kickback in a power tool as recited in claim 12 wherein said electronic switching circuit is periodically turned on, the step of sampling being performed at a time measured from when said electronic switching circuit is turned on.

14. The method of eliminating kickback in a power tool as recited in claim 12 wherein the current samples are taken in the vicinity of the peak current value during the periods when said electronic switching circuit is turned on.

15. The method of eliminating kickback in a power tool as recited in claim 12 wherein the step of filtering is performed by averaging the samples.

16. A method of eliminating kickback in a power tool of the type having a rotary shaft connected to drive an implement and an electric motor coupled to said rotary shaft to impart a rotary motion thereto, said electric motor being supplied with current through an electric switching circuit, the method comprising the steps of:
(a) closing a switch to generate a signal to said electronic switching circuit to cause said electric switching circuit to periodically supply current to said electric motor;
(b) sampling successive periods of the current through said motor at determinate points in the current waveform;
(c) filtering the sampled values of motor current;
(d) measuring the rate of change of the results of said step of filtering;
(e) comparing the measured rate of change with a threshold; and
(f) controlling said electronic switching circuit to block the supply of current to said electric motor if the measured rate of change exceeds said threshold.

17. The method of eliminating kickback in a power tool as recited in claim 16 further comprising the step of opening and closing said switch after the supply of current to said electric motor has been blocked to again generate a signal to said electronic switching circuit to cause said electronic switching circuit to supply current to said electric motor.

18. In a power tool of the type having an implement driven by an electric motor, said electric motor being supplied with current from an AC source, the improvement of a system for detecting an impending kickback condition in the power tool comprising:
(a) sampling means for sampling successive periods of the current through said motor at determinate points in the current waveform;
(b) filtering means for filtering the sampled values from said sampling means;

(c) means connected to said filtering means for storing the results of filtering successive sampled values of motor current and for computing the difference between the stored results as a measure of the rate of change of said results of filtering;

(d) comparing means for comparing said measure of the rate of change with a threshold to detect an impending kickback condition.

19. The improvement of a system for detecting an impending kickback condition in a power tool as recited in claim 18 wherein said means for sampling takes a plurality of current samples in the vicinity of the peak current value during at least each cycle of said AC source.

20. The improvement of a system for detecting an impending kickback condition in a power tool as recited in claim 18 wherein said electric motor is supplied with current from said AC source through an electronic switching circuit which is turned on each half cycle of said AC source, said sampling means including timing means to control the taking of a plurality of current samples at a time measured from when said electronic switching circuit is turned on.

21. The improvement of a system for detecting an impending kickback condition in a power tool as recited in claim 18 wherein said filtering means computes an average value of the sampled values.

22. In a power tool of the type having an implement driven by an electric motor, said electric motor being supplied with current from an AC source, the improvement of an anti-kickback control system for said power tool comprising:

(a) sampling means for sampling successive periods of the current through said motor at determinate points in the current waveform;

(b) filtering means for filtering the sampled values from said sampling means;

(c) means connected to said filtering means for storing the results of filtering successive sampled values of motor current and for computing the difference between the stored results as a measure of the rate of change of said results of filtering;

(d) comparing means for comparing said measure of the rate of change with a threshold; and (e) means for inhibiting the supply of current to said motor if the measured rate of change exceeds said threshold.

23. The anti-kickback control system as recited in claim 22 wherein said means for sampling takes a plurality of current samples in the vicinity of the peak current value during at least each cycle of said AC source.

24. The anti-kickback control system as recited in claim 22 wherein said electric motor is supplied with current from said AC source through an electronic switching circuit which is turned on each half cycle of said AC source, said sampling means including timing means to control the taking of a plurality of current samples at a time measured from when said electronic switching circuit is turned on.

25. The anti-kickback control system as recited in claim 22 wherien said filtering means computes an average value of the sampled values.

26. In a power tool of the type having a rotary shaft connected to drive an implement and an electric motor coupled to said rotary shaft to impart a rotary motion thereto, said electric motor being supplied with current through an electronic switching circuit, the improvement of an anti-kickback control system for said power tool comprising:

(a) sampling means for sampling successive periods of the current through said motor at determinate points in the current waveform generated by said electronic switching circuit;

(b) filtering means for filtering the sampled values from said sampling means;

(c) means connected to said filtering means for storing the results of filtering successive sampled values of motor current and for computing the difference between the stored results as a measure of the rate of change of said results of filtering;

(d) comparing means for comparing said measure of the rate of change with a threshold; and (e) means for controlling said electronic switching circuit to block the supply of current to said electric motor if the measured rate of change exceeds said threshold.

27. The anti-kickback control system as recited in claim 26 wherein said electronic switching circuit is periodically turned on, said sampling means including timing means to control the taking of a plurality of current samples at a time measured from when said electronic switching circuit is turned on.

28. The anti-kickback control system as recited in claim 26 wherein said sampling means takes a plurality of current samples in the vicinity of the peak current value during the periods when said electronic switching circuit is turned on.

29. The anti-kickback control system as recited in claim 26 wherein said filtering means computes an average value of the sampled values.

30. In a power tool of the type having a rotary shaft connected to drive an implement and an electric motor coupled to said rotary shaft to impart a rotary motion thereto, said electric motor being supplied with current through an electronic switching circuit, the improvement of an anti-kickback control system for said power tool comprising:

(a) a switch which when closed generates a signal to said electronic switching circuit to cause said electronic switching circuit to periodically supply current to said electric motor;

(b) sampling means for sampling successive periods of the current through said motor at determinate points in the current waveform generated by said electronic switching circuit;

(c) filtering means for filtering the sampled values from said sampling means;

(d) means connected to said filtering means for storing the results of filtering successive sampled values of motor current and for computing the difference between the stored results as a measure of the rate of change of said results of filtering;

(e) comparing means for comparing the measured rate of change with a threshold; and (f) means for controlling said electronic switching circuit to block the supply of current to said electric motor if the measured rate of change exceeds said threshold.

31. The anti-kickback control system as recited in claim 30 wherein after the supply of current to said electric motor has been blocked, said switch when opened and closed again generates a signal to said electronic switching circuit to supply current to said electric motor.

32. In a power tool of the type having an implement driven by an electric motor, the improvement of an anti-kickback control system for said power tool comprising:
  (a) monitoring means for monitoring a signal proportional to the current supplied to said electric motor;
  (b) a microprocessor connected to receive the signal from said monitoring means, said microprocessor being programmed to compute the rate of change of the signal from said monitoring means, compare the computed rate of change with a threshold value, and produce an inhibit output signal whenever the computed rate of change exceeds said threshold value; and
  (c) control means responsive to said inhibit output signal for inhibiting the coupling of power to said implement from said electric motor.

33. The antikickback control system recited in claim 32 wherein said electric motor is adapted to be connected to a source of electrical power through a switching device, said monitoring means includes a current-to-voltage converter providing a voltage signal proportional to the current to said electric motor and an analog-to-digital converter for converting said voltage signal to a digital signal supplied to said microprocessor, and said control means controls said switching device to block the connection of electrical power to said electric motor in response to said inhibit output signal.

34. The anti-kickback control system recited in claim 32 wherein said monitoring means takes successive samples of said signal proportional to current at determinate points in the signals waveform, said microprocessor further being programmed to filter the plurality of sampled values to obtain an accurate measure of motor current.

* * * * *